C. H. SAMPSON.
ARTIFICIAL EYE AND METHOD OF FITTING THE SAME.
APPLICATION FILED DEC. 20, 1917.

1,268,885.

Patented June 11, 1918.

INVENTOR:
Charles H. Sampson
by Davis & Simms
his attorneys

UNITED STATES PATENT OFFICE.

CHARLES H. SAMPSON, OF ROCHESTER, NEW YORK.

ARTIFICIAL EYE AND METHOD OF FITTING THE SAME.

1,268,885.  Specification of Letters Patent.  Patented June 11, 1918.

Application filed December 20, 1917. Serial No. 207,998.

*To all whom it may concern:*

Be it known that I, CHARLES H. SAMPSON, a citizen of the United States, and resident of Rochester, in the county of Monroe and State of New York, have invented certain new and useful Improvements in Artificial Eyes and Methods of Fitting the Same, of which the following is a specification.

The present invention relates to artificial eyes and a method of fitting the same.

An artificial eye must not only fit the eye socket of the user with ease and comfort, but the position, size, and color of the iris, as well as the size of the pupil and the veins of the white, should correspond with the good eye of the user.

At the present time, the user of an artificial eye is not only placed at a great expense whenever the artificial eye becomes broken or of no further use, but there is great difficulty in securing an eye which will meet all requirements. This is due to the fact that either the eye must be made especially for the user at great expense, or the user is probably required to visit a number of dealers in his locality before anything approaching the proper fitting, coloring, and shaping are obtained. Furthermore, merchants selling artificial eyes are required to keep a large stock of different kinds on hand in order to supply a small demand.

It is an object of this invention to make it possible for the users of artificial eyes to obtain an easy fitting artificial eye which will correspond to the good eye and will be less expensive. Another object of the invention is to provide for the fitting of the artificial eye by the dealer while at the same time giving the user the advantage of an eye designed especially for his use.

To these and other ends, the invention consists of certain parts and combinations of parts all of which will be hereinafter described, the novel features being pointed out in the appended claims.

In the drawings:—

Figure 1:
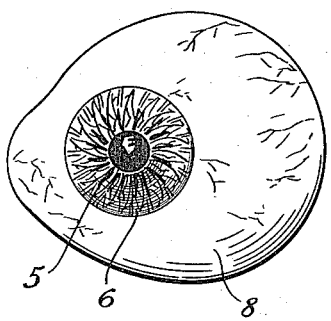
Figure 1 is a front view of an eye constructed in accordance with this invention.
Figure 2:
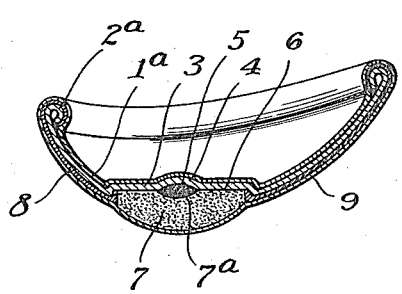
Fig. 2 is a horizontal axial section through the new eye.
Figure 3:
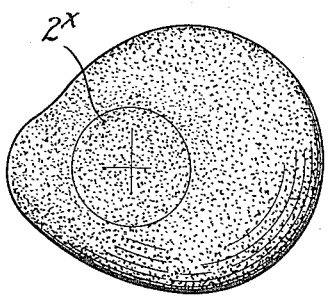
Fig. 3 is a front view of an eye sample or model.
Figure 4:
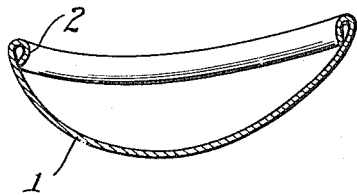
Fig. 4 is a horizontal section through the eye sample or model.
Figure 5:
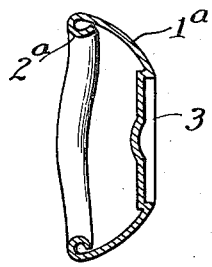
Fig. 5 is a vertical axial section through the new eye.

It is preferred that the new eye shall be sold by a dealer in the locality of the user of the artificial eye. Each dealer will be furnished with a number of models or samples such as shown in Figs. 3 and 4, these samples being differently formed so as to fit different kinds of eye sockets. Each sample or model preferably comprises a cup shaped member 1 with its edge conforming to an eye socket, such sample being made of sheet material, such as copper or other ductile material, and having its edge bent or turned inwardly at 2 so as not to hurt the eye socket. The material being ductile, it is possible to reform the body by bending or deflecting the edge of the sample until the latter fits the eye with ease and comfort. This edge is not bent, however, until the dealer has selected a sample from his lot most suited to the particular eye socket. After the sample has been reformed to the eye socket, the sample is marked to indicate the position and size of the iris, the rims of the white, and the size and position of the pupil. This may be accomplished in any suitable manner. Preferably, the sample is coated with a substance as at $2^x$ such as paraffin or other material on which lines may be scratched or marked to indicate the positions and sizes of the pupil, iris and veins. The dealer may also be provided with a chart on which are shown irises in different colors, these colors being named or numbered, and from this chart he selects a color nearest to the color of the good eye of the person to be fitted. The name or number of this color is sent with the sample reformed eye suitably marked to the manufacturer who proceeds to form the artificial eye from such instructions.

The body of the artificial eye like the sample or model is formed from sheet material such as copper or other ductile material, the manufacturer having a number of shapes corresponding to the samples furnished the dealer. The manufacturer selects from such shapes an eye with an edge of the form of the sample before adjustment, that is, one with a concavo-convex body portion $1^a$ and an inwardly turned edge $2^a$. This selected eye has its edge bent or formed to correspond with the sample and then is provided in its convex face with a depressed portion 3 of a size substantially equal to the iris, this depressed portion 3 being still further depressed at 4 for receiving a black glass or crystal piece 5 which forms the pupil simulating device. About this pupil simulating device, an iris simulating device is arranged at 6, this latter being formed in any suitable manner as by a painting on the bottom of the depressed portion 3. A lens 7 having a central concavity 7ª which receives the device 5, is fitted in the depressed portion 3, while about the depressed portion the convex face of the body 1ª is coated with a white enamel 8 which is streaked by hand to correspond to the veins or other features noted on the model or sample. The entire eye is then coated exteriorly and interiorly with a thin layer 9 of vitreous material such as transparent glass which thus acts to secure the lens 7 in the depressed portion and at the same time provides a protective coating for the metal.

From the foregoing it will be seen that there has been provided a new method of fitting artificial eyes which will permit the wearers of such eyes to secure an eye having ease and comfort, while at the same time corresponding to the good eye. The artificial eye is inexpensive to manufacture as a different mold is not required for each eye; the form of the eye being secured by reforming a standard body and then coating such body for protection against the acids of the eye socket. The manner of securing the pupil simulating device and also the pupil lens is important as these parts are held positioned on the body during the coating.

The chemicals of the eye socket tend to eat glass so that, after the use of an artificial eye for one or two years, the surface of the eye becomes rough, thus necessitating the purchase of a new eye under present conditions, as it is impossible to re-finish an eye made entirely of glass, due to the fact that the heat to which the eye must be subjected will deform the glass eye. According to this invention, the body of the eye, being made of copper or similar material, is not affected by the heat during the coating process and, as a consequence, this eye may be re-finished at a very small expense, thus making it possible for one eye to last practically a life-time.

What I claim as my invention and desire to secure by Letters Patent is:—

1. An artificial eye comprising a sheet metal body and a vitreous coating for said body that will protect the metal against the action of the water of the eye socket.

2. An artificial eye comprising a concavo-convex body of material having a rolled edge, a glass coating for said body, and a lens held to the body by the coating.

3. An artificial eye comprising a concavo-convex body of sheet-metal having a depression in its convex face, a lens fitted in said depression, and a vitreous coating for the body.

4. An artificial eye comprising a body portion, a lens, a coating for the body portion, and a pupil forming device arranged between the body and the lens.

5. An artificial eye comprising a body portion, an enamel coating simulating the white of the eye and having lines thereon to simulate the veins, and a transparent glass coating for said white and vein simulating means.

6. An artificial eye comprising a body portion formed from sheeet material into concavo-convex form and having its convex face depressed, a lens fitted in said depressed portion, and iris simulating means arranged between the lens and the body portion.

7. An artificial eye comprising a body of ductile sheet material of concavo-convex form having a rolled edge and provided with a depression in its convex face, a lens fitted in said depression, a pupil simulating device arranged between the wall of the depression and the lens, an iris simulating means arranged about the pupil simulating device between the lens and the wall of the depression, an enamel coating on the convex portion about the lens to simulate the white of an eye, and a transparent glass coating over the enamel coating.

8. A method of fitting artificial eyes which consists in selecting from a number of models one which closely approximates the eye socket to be fitted, reforming such model to the eye socket, and marking such sample while it is in the eye socket with characteristics of the good eye of the person to be fitted.

CHARLES H. SAMPSON.